United States Patent Office 2,778,752
Patented Jan. 22, 1957

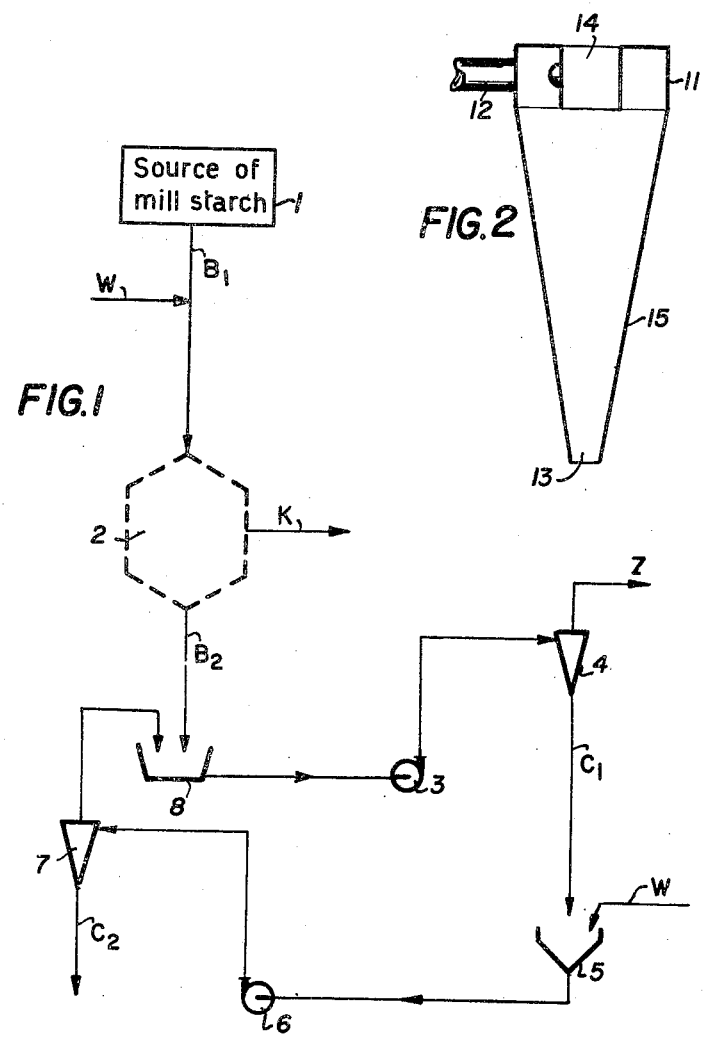

2,778,752

CORN-STARCH PROCESS INVOLVING VORTICAL CLASSIFICATION

Herman J. Vegter, Koog aan de Zaan, Netherlands, assignor to Stamicarbon N. V., Heerlen, Netherlands Application August 26, 1952, Serial No. 306,366

Claims priority, application Netherlands September 5, 1951

4 Claims. (Cl. 127—67)

This invention relates to the manufacture of starch and by-products from corn by the wet method; and in particular it relates to a method of treating the intermediate starch-containing mill stream to reduce the protein content of the final starch product.

In the manufacture of commercial starch from corn, it has been common to treat the corn by successive stages to form what is known as "mill starch" or a mill starch stream containing fine and coarse slop. This treatment generally includes steeping the corn in vats with water at an elevated temperature, a crushing of the corn kernels, and subsequent removal of germs and hulls. The resultant mill starch stream consists of starch, bran, gluten, cell conglomerates and generally also heavy contaminations like sand or rust particles, all of which is suspended in the so-called process-water, which consists of water with dissolved chemicals, such as sulphur dioxide ($SO_2$) which is added during the first stage of the treatment.

To prepare high grade starch from the mill starch stream it is necessary to separate the starch from the bran, cell conglomerates and heavy contaminations. The cell conglomerates, which consist of starch, bran and gluten, must be removed from the mill starch stream to provide high grade starch on account of their protein content which amounts to approximately 8 percent.

Bran, starch and cell conglomerates all have a specific gravity of about 1.6; the gluten has a lower specific gravity and the heavy contaminations have a higher specific gravity.

The size of the starch particles ranges from about 10 to 30 microns, the smallest cell conglomerates have a size of about 60 microns and the gluten, bran and heavy contaminations are present in a wide size range.

It is one of the major problems of the corn-starch industry to effect a sharp separation in an efficient way so as to obtain a high grade starch fraction on the one hand and starch poor fractions of contaminations on the other hand. It is the main object of this invention to provide a solution for this problem.

The old separation processes generally include two main stages. First the mill starch stream is screened so as to remove particles of 80 microns and larger, in other words the coarser cell conglomerates and bran particles. Then the underflow from the screening operation is treated on tables or in centrifuges, so as to remove the slower settling particles, in other words the fine bran and the gluten. It will be clear that the heavy contaminations and the cell conglomerates of 60 to 80 microns thus remain with the starch. Thus it is in particular an object of this invention to provide a process which produces starch with only a minimum amount of heavy contaminations and cell conglomerates.

By prior practice the screening operation mostly is effected in two stages; the mill starch stream is first screened on a relatively coarse mesh, say about 120 microns, and the underflow therefrom is screened at 80 microns. It will be clear that screening at 80 microns is a costly operation, the more so because bran tends to clog the screens and cell conglomerates wear them down relentlessly. It therefore is another object of the present invention to provide a process for the manufacture of corn starch which does not require screening at about 80 microns or less.

By the present invention these and other objects are attained by subjecting the mill starch stream to vortical classification, making the cut for cell conglomerates in the range between 40 and 80 microns, but preferably at 60 microns. The coarse fraction obtained thereby contains substantially all cell conglomerates and substantially all heavy contaminations which are coarser than 25 microns, whereas the finer fraction contains the major part of the process water and of the starch, bran and gluten. The starch is then recovered from the finer fraction by conventional processes, such as those wherein tables and/or centrifuges are used and wherein also use can be made of hydrocyclones. The coarse fraction from the vortical classification contains a small amount of process water with starch, gluten and bran, and to recover most of the starch therefrom this fraction may be diluted with water and then subjected to a similar vortical classification as that mentioned above.

Before subjecting the mill starch stream to the vortical classification proposed by the present invention it may be screened or classified so as to remove the coarsest cell conglomerates, for instance those of 110 microns and larger or those of 200 microns and larger from the mill starch stream. The cell conglomerates thus obtained may be ground and recirculated to recover the starch therefrom.

Under "vortical classification" is understood classification by means of a vortex. A vortex is established by continuously pressure feeding a liquid or suspension into a closed circular chamber and withdrawing at least a significant part of the liquid or suspension centrally therefrom. For this purpose use is preferably made of a hydrocyclone, but also vortex chambers may be used.

The size at which a classification is effected depends primarily on the diameter of the hydrocyclone or vortex chamber used for that purpose. With a larger hydrocyclone the cut will be made at a larger size. The classification depends further on the other dimensions of the hydrocyclone or vortex chamber and on the operating conditions such as infeed pressure. It further will be clear that specifically heavy particles will be separated according to a finer mesh than are specifically light particles and that the mesh of separation also depends upon the shape of the particles to be classified. Bran is for instance separated according to a significantly coarser mesh than are cell conglomerates.

In the process according to the invention best results are obtained with hydrocyclones of the conventional design. A very efficient separation is for instance effected with the hydrocyclone and under the operating conditions mentioned hereinafter in the example, but it should be understood that satisfactory results can also be obtained with different hydrocyclones and under different operating conditions, and also with vortex chambers. Other types of classifiers are less useful for the classification of a mill starch stream on account of either their large water consumption or the long detention time of solids therein.

The invention will be explained in more detail with reference to the drawings, wherein Figure 1 is a scheme of part of a corn-starch factory and Figure 2 is a sectional view of a hydrocyclone classifier in that factory.

In Figure 1, 1 indicates a source of a mill starch stream, 2 is a screen, 3 and 6 indicate pumps, 5 and 8 tanks and 4 and 7 indicate multihydrocyclone classifiers (a multihydrocyclone classifier is a constructional unit of a number of hydrocyclone classifiers arranged in parallel).

Figure 2 shows a single hydrocyclone classifier. This hydrocyclone comprises a cylindrical section 11, a conical section 15, a tangential feed duct 12, a vortex finder 14 and an apex aperture 13.

A conventional hydrocyclone such as shown in Figure 2 comprises a conical section merging into a cylindrical section. The conical section has an outlet or discharge for coarse particles at its apex, while the cylindrical section is located at what would be generally the base of the cone and includes an outlet or discharge for fines. Suspension to be treated is fed to the hydrocyclone tangentially into the cylindrical section which normally has what is called a vortex finder extending from the base that comprises the fines base discharge. The opening in the apex and in the base are co-axial. Coarse solids are forced by centrifugal force toward the periphery of the conical section from whence the fraction of them discharged from the apex of the cone while the bulk of the liquid with fractionated fines flows axially of the hydrocyclone to discharge through the vortex finder.

A vortex chamber usually is cylindrical and has near one end a central outlet for fines and an outlet at the periphery for coarse particles. Suspension to be treated is fed to the vortex chamber tangentially near the end removed from the discharge outlets.

It should be mentioned, however, that many other forms of hydrocyclones and vortex chambers are also well known; for instance a hydrocyclone may be cylindrical and a vortex chamber may have the shape of a truncated cone. Hydrocyclones and vortex chambers to be used in the process according to the invention should have a largest diameter of at most 50 mm. Larger units are not useful for classifying solid particles as those present in the mill starch stream.

In operation the mill starch stream $B_1$ from source 1 is supplied to screen 2 where water W is added. The oversize K from the screen 2 consists of cell conglomerates and coarse bran. This fraction K may be further treated to recover starch which can be freed by grinding of the cell conglomerates.

The throughfall $B_2$ from screen 2 is received in tank 8 and fed by pump 3 to multihydrocyclone classifier 4. The hydrocyclones thereof are adapted to separate all conglomerates at about 60 microns. Consequently the fraction Z discharged through the vortex finders of the hydrocyclones consists of the bulk of the starch, bran, gluten and process water, whereas the fraction $C_1$, discharged through the apex apertures of the hydrocyclones contains the bulk of the fine cell conglomerates and of the heavy contaminations larger than 25 microns and small amounts of process water, starch, gluten and bran. This fraction $C_1$ is received in tank 5 where it is diluted with water W and then is fed by pump 6 to multihydrocyclone classifier 7, the operation of which substantially corresponds with the operation of multihydrocyclone classifier 4. Most of the starch, gluten and bran contained in fraction $C_1$ is discharged through the vortex finders of multihydrocyclone 7 and is returned to tank 8 where it is united with fraction $B_2$. The fraction $C_2$ which is discharged through the apex apertures of multihydrocyclone 7 contains the bulk of the fine cell conglomerates and of the heavy contaminations larger than 25 microns. This fraction $C_2$ may be further treated to recover starch therefrom or it may be used in cattle food. The fraction Z from multihydrocyclone classifier 4 is further treated in a conventional way to obtain clean starch therefrom, for which purpose use may be made of starch tables, centrifuges or hydrocyclones.

*Example*

In a corn starch factory in which the process according to Figure 1 was used, screen 2 had apertures of 110 microns. The throughfall $B_2$ of those screens amounted to 67 cubic meters per hour with a specific gravity of 7° Baumé. This fraction was united with the overflow fraction from multihydrocyclone 7 and then pumped at a pressure of 2 kilograms per square centimeter gauge pressure through a multihydrocyclone classifier (4) comprising 80 hydrocyclones of the type shown in Figure 2, arranged in parallel, the dimensions of said hydrocyclones being as follows:

Diameter of cylindrical section 11_____mm___ 30
Diameter of feed aperture 12_____mm___ 6
Diameter of apex aperture 13_____mm___ 5.5
Diameter of vortex finder 14_____mm___ 12
Cone angle of conical section 15_____deg___ 20
Height of cylindrical section 11_____mm___ 12
Length of vortex finder 14 inside cylindrical section 11 _____mm___ 12

The overflow fraction Z from these hydrocyclones amounted to 15 liters per minute per hydrocyclone and it contained about 1 percent of the cell conglomerates of 60 to 110 microns and about 2 percent of the heavy contaminations of 25 to 110 microns in the feed of the hydrocyclone.

The fraction $C_1$ leaving this multihydrocyclone classifier through the apex apertures amounted to 0.4 liter per minute per hydrocyclone. It had a specific gravity of 12° Baumé.

In order to effect a separation between the free starch particles and the cell conglomerates in the latter fraction $C_1$ it was diluted with water down to 3.5° Baumé in tank 5 and by means of pump 6 supplied to multihydrocyclone classifier 7 at a pressure of 1.75 kilograms per square centimeter gauge pressure. Multihydrocyclone classifier 7 contained 8 hydrocyclones which were identical with those of multihydrocyclone 4.

The overflow fraction from multihydrocyclone 7 was returned to tank 8. The apex fraction $C_2$ from multihydrocyclone 7 contained an average of 35 kilograms of cell conglomerates per hour, approximately 1 kg. of sand and rust particles and an average of 30 kilograms of starch. This fraction was worked into cattle feed. The overflow fraction Z from multihydrocyclone 4 was passed to a system of starch tables and centrifuges (not shown in Figure 1) where it was freed of bran and gluten. After finally being dried the resulting starch had a protein content which averaged 0.22 to 0.30 percent which was 0.06 to 0.10 percent lower than the protein content of starch of the same corn which had been screened on screens with apertures of 80 microns instead of having been treated according to the invention.

I claim:
1. In the wet milling process of manufacturing corn starch wherein a mill stream containing process water, starch, bran, gluten, cell conglomerates and heavy contaminations is produced, the improvement for lowering the protein content of the final starch product which comprises the steps of screening said mill stream to remove coarse cell conglomerates and bran particles exceeding a size within the range of from 110 to 200 microns therefrom, vortically separating the screened mill stream into two fractions, the first of said fractions containing the bulk of the cell conglomerates exceeding a size within the range of from 40 to 80 microns and heavy contaminations, and the second of said fractions containing the major portion of the process water, starch, bran and gluten, and then separating the final starch product from said second fraction.

2. A process as defined in claim 1, including the further steps of diluting said separated first fraction with water, vortically separating said diluted first fraction into third and fourth fractions, the third of said fractions containing the bulk of the cell conglomerates and heavy contaminations, and the fourth of said fractions containing process water, starch, bran and gluten, removing said third fraction from the system, and recycling said fourth fraction with fresh feed to the initial vortical separation step.

3. In the wet milling process of manufacturing corn starch wherein a mill stream containing process water, starch, bran, gluten, cell conglomerates and heavy contaminations is produced, the improvement for lowering the protein content of the final starch product which comprises the steps of screening said mill stream to remove therefrom coarse partcles exceeding a size of about 110 microns, vortically separating the screened mill stream into two fractions, the first of said fractions containing the bulk of the cell conglomerates exceeding a size of about 60 microns and the bulk of the heavy contaminations exceeding a size of about 25 microns, and the second of said fractions containing the major portion of the process water, starch, bran and gluten, and then separating the final starch product from said second fraction.

4. A process as defined in claim 3, including the further steps of diluting said separated first fraction with water, vortically separating said diluted first fraction into third and fourth fractions, the third of said fractions containing the bulk of the cell conglomerates and heavy contaminations, and the fourth of said fractions containing process water, starch, bran and gluten, removing said third fraction from the system, and recycling said fourth fraction with fresh feed to the initial vortical separation step.

References Cited in the file of this patent
UNITED STATES PATENTS

| | | |
|---|---|---|
| 2,013,668 | Peltzer | Sept. 10, 1935 |
| 2,316,807 | Peltzer | Aug. 30, 1943 |
| 2,543,660 | Eckers | Feb. 27, 1951 |
| 2,556,322 | Eckers | June 12, 1951 |
| 2,689,810 | Vegter | Sept. 21, 1954 |